(12) United States Patent
Jéger (10) Patent No.: US 10,345,609 B2
(45) Date of Patent: Jul. 9, 2019

(54) VIBRATING GRID SPACE VISUALIZATION DEVICE

(71) Applicant: József Jéger, Budapest (HU)

(72) Inventor: József Jéger, Budapest (HU)

( * ) Notice: Subject to any disclaimer, the term of this patent is extended or adjusted under 35 U.S.C. 154(b) by 0 days.

(21) Appl. No.: 15/644,995

(22) Filed: Jul. 10, 2017

(65) Prior Publication Data

US 2017/0307899 A1   Oct. 26, 2017

Related U.S. Application Data

(63) Continuation-in-part of application No. 14/779,764, filed on Sep. 24, 2015, now abandoned.

(51) Int. Cl.
*G02B 26/08* (2006.01)
*G02B 27/22* (2018.01)
*H04N 13/32* (2018.01)
*H04N 13/315* (2018.01)
*H04N 13/356* (2018.01)

(52) U.S. Cl.
CPC ..... *G02B 27/2264* (2013.01); *G02B 27/2214* (2013.01); *H04N 13/315* (2018.05); *H04N 13/32* (2018.05); *G02B 26/0841* (2013.01); *H04N 13/356* (2018.05); *H04N 2213/001* (2013.01)

(58) Field of Classification Search
CPC ............ G02B 27/2264; G02B 27/2214; G02B 26/0841; H04N 13/32; H04N 13/315; H04N 13/356; H04N 2213/001
See application file for complete search history.

(56) References Cited

U.S. PATENT DOCUMENTS

2012/0086709 A1* 4/2012 Yeh ..................... G02B 27/2214
                                                                345/419

\* cited by examiner

*Primary Examiner* — Nathanael R Briggs
(74) *Attorney, Agent, or Firm* — Sarika Singh; McNeely, Hare & War LLP (57) ABSTRACT

The object of the present invention is a vibrating grid based space generating device, which enables 3D perception for the user, and which comprises a containing frame (1), an image display surface (20), and a vibrating grid (10) placed in front of the image display surface (20), wherein vertically positioned, angularly arranged blocking strips (13), all having a set depth, are attached in immoveable fashion to the frame (11) of the vibrating grid (10), such that their front edges are radially focused on a single vertical edge at a point along a focal arc (26); and the vibrating grid (10) is connected to the containing frame (1) by means of lower and upper connecting elements (12*a*, 12*b*) in a manner that accomplishes vibration in the horizontal plane along an arc of vibration (18).

4 Claims, 7 Drawing Sheets

VIBRATING GRID SPACE VISUALIZATION DEVICE

CROSS-REFERENCE TO RELATED APPLICATIONS

This application is a continuation-in-part of U.S. application Ser. No. 14/779,764 entitled "Vibrating Grid Based 3D Space Visualization Device", filed on Sep. 24, 2015, which claims priority under 35 USC 371 to PCT/HU2013/000137, filed Dec. 30, 2013 (published as WO/2014/155143), which claims priority to Hungarian Application Nos. P1300171, filed on Mar. 25, 2013 and P1300519, filed on Sep. 6, 2013. The disclosures of the prior applications are considered part of and are incorporated by reference in their entirety in the disclosure of this application.

The present invention constitutes a vibrating-grid space-visualisation device for a single user, which generates a realistic, 3D view equivalent to natural sight, without the need for specialised 3D glasses.

SCOPE OF THE INVENTION

The possible field of application of the invention includes applications in health, education, communication, the entertainment (film, television) and advertising industries, and various fields of science and research, as well as those of national, public, and private security.

PRIOR ART

The realisation of 3D without recourse to special glasses has already been achieved through various solutions (parallax barrier, lenticular, holographic, and other methods), among which is a solution representing prior art disclosed by patent document No. P1100360 HU, which presents a device for the display of stereoscopic pictures, in which an unblocking pattern with a repetitive pattern for unblocking is placed between the image and the eyes in such a manner that the unblocking pattern simultaneously makes the image intended for the left eye visible to the left eye only, while the image intended for the right eye remains blocked to the left eye and is visible to the right eye only.

The drawback to this solution is that at any given time, each eye sees a different image, such that a maximum of 50% of each image is visible to the respective eye for which it is intended.

A further weakness is associated with the interference applicable to a certain part of the two, simultaneously visible images due to the "parallax barrier" method employed.

In the solution according to this invention, the partial blocking associated with the abovementioned "parallax barrier" is rendered unnecessary, as each eye always sees a complete image, which the other eye is completely blocked from viewing, alternation between the two eyes being accomplished by means of a vibrating grid.

Patent document No. GB 2476160 also discloses a solution representing prior art, specifically, a flat panel 3D television which comprises a matrix of light sources rotating on a first axle, a collimation device which collimates the light emitted from each source into a single dimension, a device arranged to rotate the light sources, a modulation device that modulates the light intensity emitted from each light source, and a rotation-synchronizing device arranged to control and synchronise the rotation rate and/or angle of each light source. The invention also includes a device which electronically stores a time-sequence of two-dimensional mirror images of a 3D image emitted from a number of horizontally displaced angles, where the mirror-image data is used to drive the modulation device and/or rotation synchronisation device in order to produce a real-time 3D mirror image of a given image.

The drawback to this solution representing prior art is that, due to the grid thickness placed horizontally and vertically between the rows of mirrors, the motor controlled mirrors that project the images can send only a certain percentage (approximately 50-60%) of the image to the eyes. Therefore, the images will always be grainy and incomplete. The apparatus is complicated, its manufacturing costly, and a real-life 3D experience is not achieved.

Yet another solution representing prior art is found in patent specification WO 94/17638 A1 where the method and apparatus produce 3D imagery, including display on a screen surface that contains two or more spaced-apart angles of view about a common centre, resulting in an image that is segmented and separated. This segmented and separated image is viewed through a grid-like apparatus, the size and shape of which correspond substantially to the dimensions of the segments of the image, i.e. to the image segments. The grid is placed at a distance from the screen where segments of imagery acquired left of the common image centre are seen through sections of the grid substantially by the left eye of the viewer, while segments of imagery acquired right of the common image centre are seen through grid sections substantially by the right eye of the viewer. The relationship of left and right segments of imagery relative to the grid sections is maintained when the imagery is displayed on the screen by oscillation of the grid. The invention is, in fact, another "parallax barrier" solution, with grid sections located on one or three consecutive horizontal planes, such that the viewer sees through them as they are displaced to the left or right.

In the solution according to the present invention, however, the vibrating grid is arranged vertically in front of and parallel to the image display surface, while the similarly vertically disposed blocking strips inside it are positioned radially, so that their edges are focused on a vertical edge at one point on a focal arc located between the viewer's eyes, such that the radial lines, due to the horizontal oscillation of the vibrating grid along the arc of vibration, arrive to the right or left eye as lies on the focal arc.

A further prior art patent document is US2012/0086709 disclosing a 3D/2D display device switching module installed to the front side of a display device including a first axle and a second axle installed on both sides of the display device respectively, and a thin film unit looped between the two axles. The first axle is coupled to a first power source. The thin film unit has a transparent area and at least one grating area. After the first power source drives the first axle to rotate clockwise or counterclockwise, the transparent area or the grating area is switched to align with the display device to produce a 3D/2D display effect. In addition, the present invention further includes a containing box installed at the backside of the display device for stacking and accommodating the thin film unit with more different types of grating areas. This solution is different from the present invention in that the present invention is a device exclusively for 3D viewing. Also, the present device does not include a thin film unit with a transparent area rotating with a grating area, thus achieving a 2D/3D switching effect.

In the above cases, we provide our eyes and cerebellum, in an unnatural manner, with light and image effects produced improperly in various manners, which can produce dizziness or a general feeling of unwellness. It is of course true that in the case of versions using glasses, the viewer may choose from a variety of sizes of glasses, but the probability that the viewer would choose such glasses as correspond to his or her own interocular distance is slight.

With both lenticular and parallax barrier applications in glasses-free 3D image displays presently on the market, a certain degree of crosstalk is experienced, the result of which a realistic image is not produced and adverse health effects similar to those mentioned above may occur. These adverse health effects arise due to the fact—among others—that the cerebellum is unable to process the information intended for the other eye. This is clearly evident when the left and right images on a 3D display are simply switched. If image display inappropriate to the interocular distance and the angling of the eyes outward or inward are also taken into consideration, the degree of the adverse health effects to which users are often exposed is clear.

The solution according to the present invention, however, is accomplished using neither the "parallax barrier," nor the lenticular method, but one that differs from each of these, consisting of a vibrating grid in which vertical blocking strips are constructed radially, so as to enclose an angle between them, such that if their edges were to be extended, they would point toward the focal point of the angle of sight located on a focal arc lying between the eyes, which vibrating grid is oscillated to the right and left in a horizontal plane along an arc of vibration.

The 3D experience is presented to the viewer as if the user had seen it with his or her own eyes in a manner corresponding to natural vision, that is, exactly as it was recorded by the cameras.

In this way, all the adverse health effects associated with solutions according to prior art are eliminated, and a simpler, less costly apparatus with a broader field of application is created.

One of the fundamental conditions of three-dimensional sight is that a light source or image reaches the eyes from the space in front of the viewer from two different angles almost simultaneously, which images the cerebellum perceives in the same instant, then interprets as a three-dimensional experience.

The similarities and differences between the two-dimensional images appearing on the retina arise from the interocular distance (the distance between the eyes), which differs from person to person but in general varies from around 40 to 80 mm. The image interpreted by the cerebellum as three-dimensional is, in fact, composed of two individual two-dimensional images. If, for example, one conducts the experiment of observing from up close an object situated only a short, perpendicular distance away, while alternately closing the left and right eyes, it may be concluded that while the object remains in one place, the image of it is "displaced" to the left and right as the left and right eyes view its left and right sides, respectively. This "displacement" corresponds precisely with the interocular distance (the distance between the viewer's eyes), the angle of sight of the left and right eye being determined by the distance from the object observed.

If one observes this same spectacle, i.e. focuses on the object located between the two eyes, while at the same time noting the image of an object in the background, then it may be concluded that one observes a single image of the object, and a double image of parts of the object in the background. If the inverse experiment is conducted, i.e. if one focuses on an object in the background while at the same time noting what happens to the image of the object in the foreground, then one will observe that it is now the object in the foreground that is seen double.

In creating the present invention, the object was to display a three-dimensional space without recourse to special glasses, such that, with reference to the information discussed above, the question of a solution to 3D vision was approached from the aspect of the conclusions drawn there.

It is well known that the cerebellum, in some way, even where it finds it disconcerting, comprehends and interprets the left and right images appearing on the retina independently of how they came to be there. With this knowledge it is also clear that the brain is capable of interpreting a reproduced 3D recording or image, if the two images that compose the 3D recording or image reach the eyes from a two dimensional (flat) surface, so that one eye does not see what is visible to the other eye at a given time. When looking through a rotating blade fan from up close, the space beyond the blades of the fan is seen in 3D, independently of the fact that the viewer is seeing through the blades with only one eye at one time. One of the fundamental conditions for three-dimensional sight is that the two eyes see two two-dimensional images at approximately the same time. If, following this observation, the viewer moves slowly backward from the fan, the depth, i.e. the 3D effect, will be detectable in the same manner by the eyes and cerebellum.

In creating the present invention, the realisation was that the object of producing a 3D effect, or spatial image similar to natural sight could be attained with the aid of a special grid device that allowed each eye to view images displayed or reproduced at approximately the same time separately, in such a manner that the image display surface at the moment of the alternation of the image—at a time not sensed by the cerebellum, i.e. at intervals of approximately $1/100^{th}$ of a second—is blocked to the user's eyes by a single dark surface in exactly the same way as in the creation and replay of moving pictures. The spectacle termed 3D is, in fact, a unified interpretation, i.e. a fusion created from two instances of a two-dimensional image appearing the cerebellum. An additional realisation was that a realistic, moving 3D image seen without glasses, unlike with solutions to date, can be created if we send appropriate images from a flat, two-dimensional surface to the appropriate eyes, alternating images at a rate of at least 24 images/sec., such that in the meantime, a specially constructed, grid-like apparatus is immovably set in front of the alternating left and right images appearing on the image display surface, in which apparatus radially arranged vertical strips each enclose an angle relative to the other, with the vibrating grid horizontally displaced along an arc of vibration, such that the displacement is both synchronous with the rate of alternation of the left and right images, and ensures that the viewer can see through the grid apparatus with alternating eyes, such that as one eye sees through the apparatus, the other eye is simultaneously prevented from doing so. Because the movement is continually rapid (24 images/sec.), the displacement constitutes vibration. If the images are displayed on the image display surface so that their "displacement" from each other in the horizontal direction corresponds precisely to the interocular distance of the user (which is particular to each individual), and if the user is placed at a certain distance and at a certain focused alignment of vertical height from the construction thus arranged and configured, and if furthermore, the images, displayed at a rate of at least 24 images per second, are composed of the alternating left and right images taken using a 3D camera, and a certain dead zone is applied between the appearance of those images at the moment of image alternation, then the objects of the present invention have been attained.

Thus, the present invention constitutes a vibrating-grid space-visualisation device that, without the need for specialised glasses, gives a single user the ability of 3D perception, the containing frame of which comprises an image display surface and, in front of the image display surface, a vibrating grid, constructed such that within the frame of the vibrating grid, vertically positioned blocking strips, all having a set depth, are arranged angularly and attached in immovable fashion, their front edges extending radially so as to focus on the vertical edge of a focal point located on a focal arc, and that the vibrating grid is connected to the containing frame by means of lower and upper connecting elements in such a way as to allow vibration in the horizontal direction along an arc of vibration.

SUMMARY OF THE INVENTION

The preferred embodiments of the vibrating grid space visualisation device according to this invention are described in detail in the claims below.

In one general aspect, there is provided a vibrating-grid space visualisation device enabling 3D perception for a single user, including a containing frame (1), an image display surface (20), and a vibrating grid (10) placed in front of the image display surface (20), where vertically positioned, angularly arranged blocking strips (13), all having a set depth, are attached in immoveable fashion to the frame (11) of the vibrating grid (10), such that their front edges are radially focused on a single vertical edge at a point along a focal arc (26); and the vibrating grid (10) is connected to the containing frame (1) by means of lower and upper connecting elements (12a, 12b) in a manner that accomplishes vibration in the horizontal plane along an arc of vibration (18).

Embodiments of the device may include one of the following features. The image display surface (20) maybe be constructed behind the vibrating grid (10) on the interior surface of the containing frame (1). The vibration of the vibrating grid (10) may be accomplished either mechanically, or by electric power. In another embodiment, more than one vibrating grid (10) may be constructed in series, with a first vibrating grid adjacent to a second vibrating grid.

The solution according to this invention is described in greater detail via the following drawings:

FIGS. 8, 9 and 10 illustrate three views of another possible embodiment of the invention, for better understanding the vibrating grid is illustrated as a top cross-sectional view, and the top view is shown in semiperspective.

Figure 1:
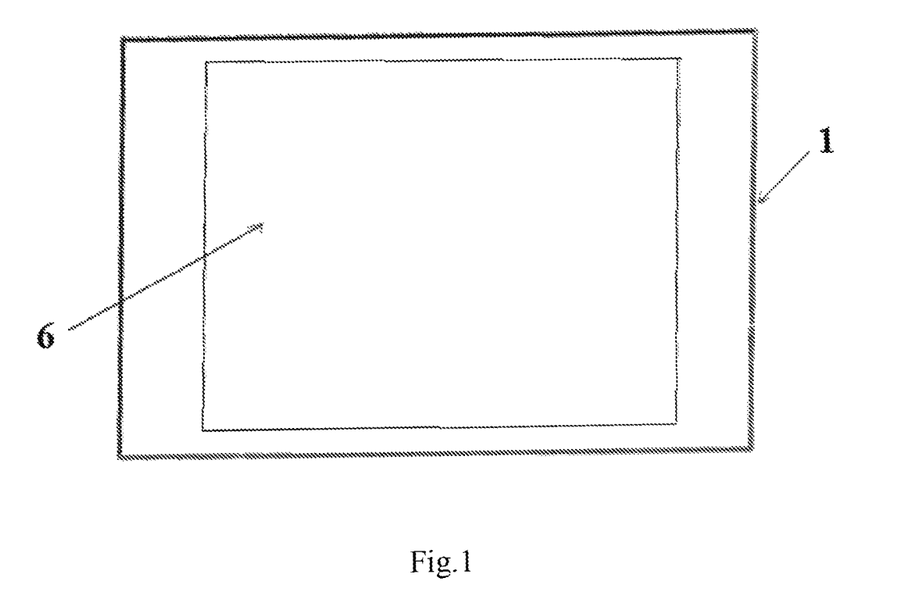
FIG. 1 shows a front view of the containing frame.

FIG. 1 shows the containing frame 1 and the transparent cover panel 6 according to this invention.

Figure 2:
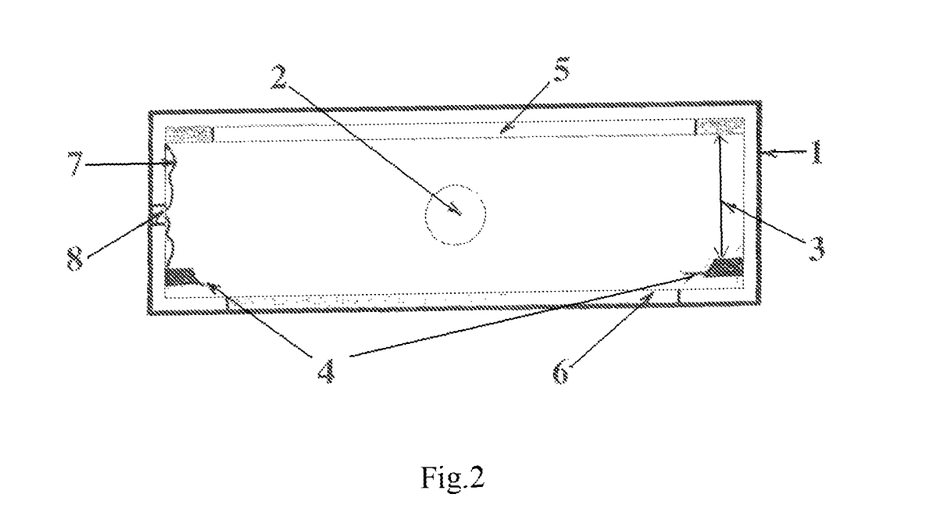
FIG. 2. shows a top view of the containing frame.
Figure 3:
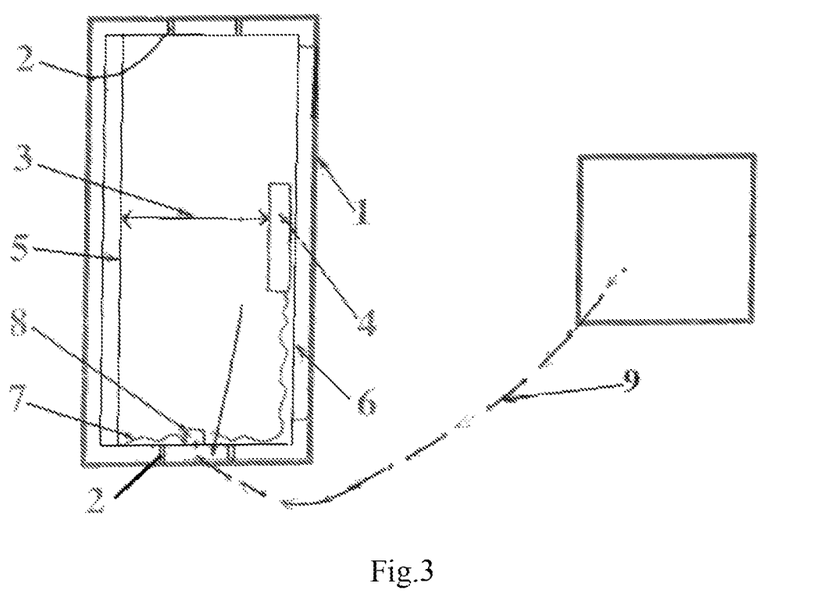
FIG. 3. shows a side view of the containing frame, with the control cable and potentiometer, which potentiometer does not constitute part of the present invention.

In FIGS. 2 and 3, the respective top and side views of the containing frame 1 clearly show the connecting port 2 and the vibrating distance 3. The vibrating distance 3 determines the range of movement of the vibrating grid 10 visible in FIG. 4, while the magnetic stop-pins halt the vibrating grid 10 at the end-points. Also visible are the image projection housing 5, the transparent front panel 6, the wire 7, the control unit 8, and the control cable 9, which is preferably connected to a potentiometer, which component does not constitute part of the present invention.

Figure 4:
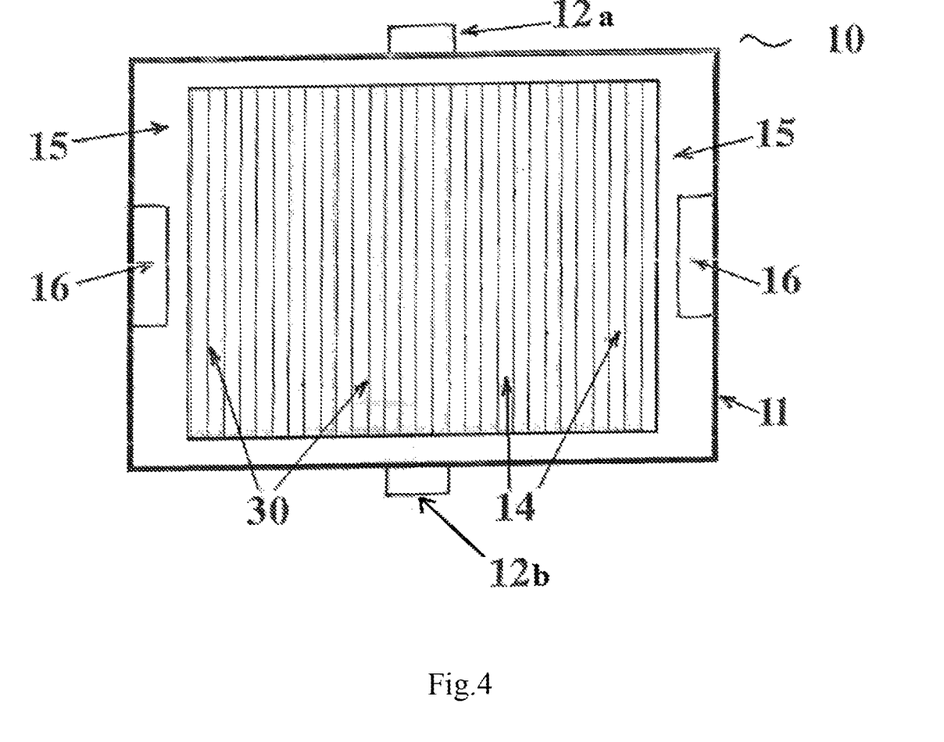
FIG. 4 shows a front view of the vibrating grid, with the theoretical focal point between the user's eyes.

FIG. 4 offers a theoretical illustration of the front view of the vibrating grid 10 from precisely the focal point of the angle of sight 25 between the eyes of the user 24. Also visible are the lower 12a and upper 12b connecting elements, which serve to connect the vibrating grid 10 to the containing frame 1 visible in FIG. 1, and which, in the present embodiment, are constructed on the centreline of the vibrating grid 10. Finally, the figure shows the buffer columns 15 and iron inserts 16, which, in concert with the magnetic stop-pins 4, regulate the movement of the vibrating grid 10. This theoretical illustration clearly shows the front edges of the immovably attached blocking strips 13, between which are the gaps 14 through which the user sees.

Figure 5:
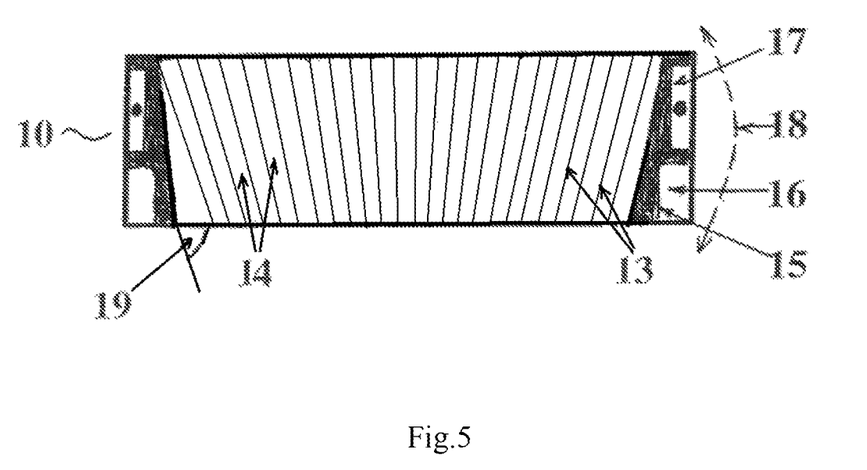
FIG. 5 shows a top cross-sectional view of the vibrating grid.

FIG. 5 offers a top cross-sectional view of the vibrating grid 10. The diagram shows, in illustrative fashion, how the blocking strips 13 arranged angularly within the vibrating grid 10 each have a certain width, which widths extend radially in the direction of the eyes of the user 24. By viewing from the direction of the user 24, the depth of sight permitted by the blocking strips 13, which depth arises as a consequence of the width, is discernible. In the present embodiment, the depth of sight permitted by the blocking strips 13 corresponds roughly to the overall depth of the vibrating grid 10. Also visible are the dampers 17, the iron inserts 16, and the buffer columns 15. Also indicated on the diagram is the angle of sight 19, which enables the user to see through the vibrating grid 10.

Figure 6:
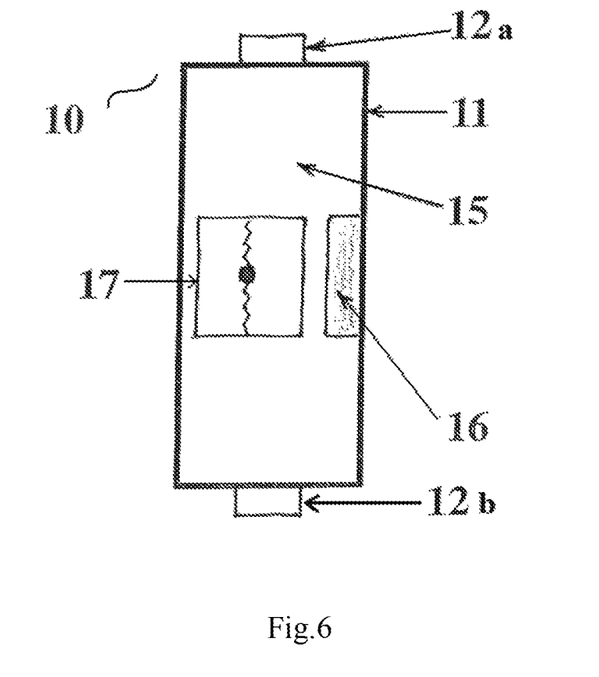
FIG. 6 shows a side view of the vibrating grid.

FIG. 6, a side view of the vibrating grid 10 according to this invention, shows the frame 11, the lower and upper connecting elements 12a and 12b, the buffer columns 16, the iron insert 16, and the dampers 17.

Figure 7:
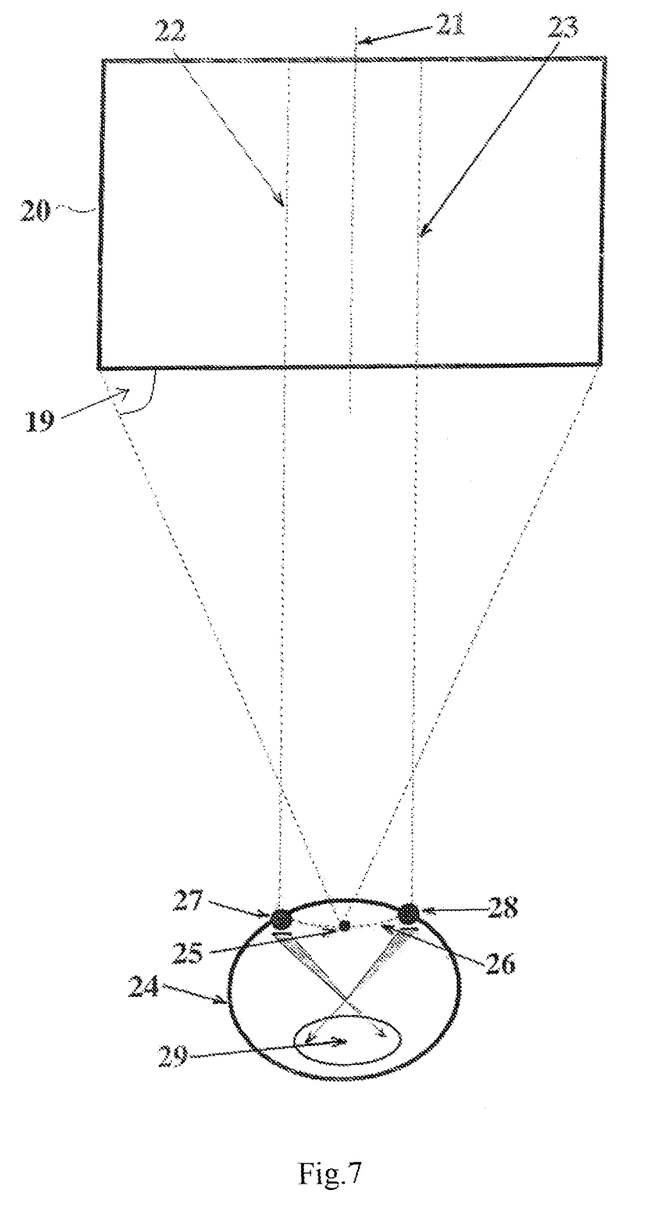
FIG. 7 illustrates the theoretical operation of the invention from the perspective of the two eyes at the moment of image alternation, with the image display surface shown as a front view and the top view shown in semiperspective.

FIG. 7 illustrates the theoretical "operation" of the device according to this invention at the moment of image alternation, from the perspective of the eyes, including helpful indications related to the image display surface 20 and the user 24, such as the spatial centreline 21, the left image centreline 22, the right image centreline 23, the focal point of the angle of sight 25, the focal arc 26, the left eye 27, the right eye 28, the cerebellum 29, and the angle of sight 19. The diagram shows how if the edges of the blocking strips 29 visible in FIG. 4 are focused on the focal point of the angle of sight 25 on the focal arc 26, then the image is completely blocked to the left 27 and right 28 eyes by the uniform lateral surfaces of the blocking strips 13, i.e. to the right eye 27 by the right uniform surface, and to the left eye 28 by the right uniform surface, and thus the eyes cannot see past the blocking strips 13.

Figure 8:
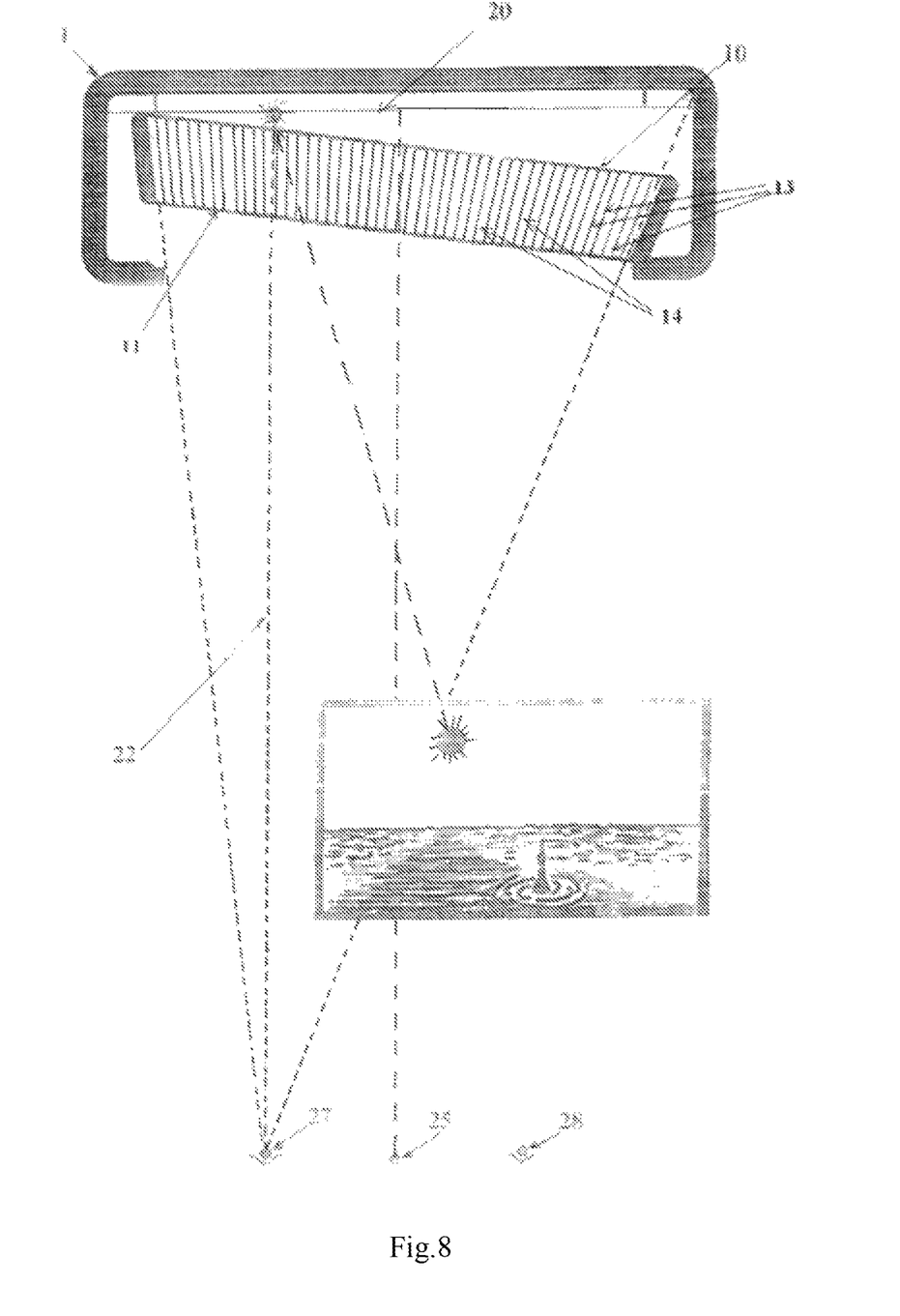
FIG. 8 illustrates the operation of the device according to this invention in the position in which the left eye sees past the grid.

FIG. 8 shows the device in precisely the position where the left eye sees past it. Visible in the diagram are the containing frame 1, with the image display surface 20 on its interior, and inside, the vibrating grid 10 disposed horizontally and turned in the direction of the left eye 27, to the frame 11 of which are immovably attached the blocking strips 13, the front edges of which are arranged radially so as to focus on the left eye 27. In this view, it is apparent that only the left eye 27 sees the image, as only the left eye 27 can see through the gaps 14 between the blocking strips 13. It will also be noted that the left eye 27 is directed exactly perpendicularly to the image display surface 20 along the left image centreline 22. At the same time, the image is blocked to the right eye 28 by the uniformly dark right lateral surface formed by the blocking strips 13, i.e. said surface prevents the user from seeing through the display.

Figure 9:
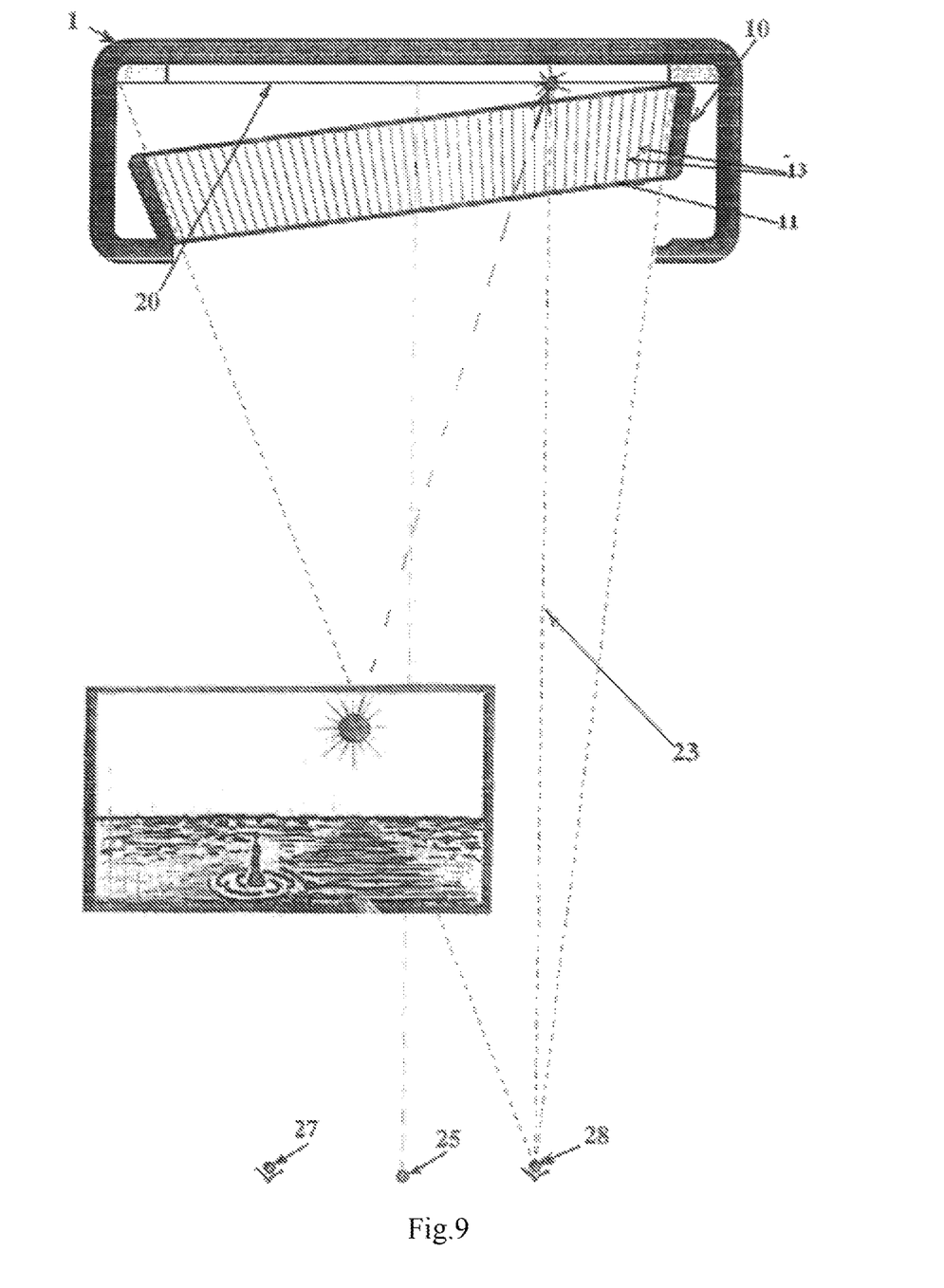
FIG. 9 illustrates the operation of the device according to this invention in the position in which the right eye sees past the grid.

FIG. 9 illustrates the operation of the device according to this invention at the moment when the right eye 28 sees past it. Visible in the diagram are the containing frame 1, the image display surface 20, and the vibrating grid 10, with the blocking strips 13 attached immovably to its frame 11. Here, the blocking strips 13 of the vibrating grid 10 are angled in the direction of the right eye 28, so that the front edges of the blocking strips 13 are focused radially on a vertical edge at the right eye 28, and thus, only the right eye 28 sees the image recorded by the right camera. At the same time, the uniformly dark left lateral surface of the blocking strips 13 block the image to the left eye 27.

Figure 10:
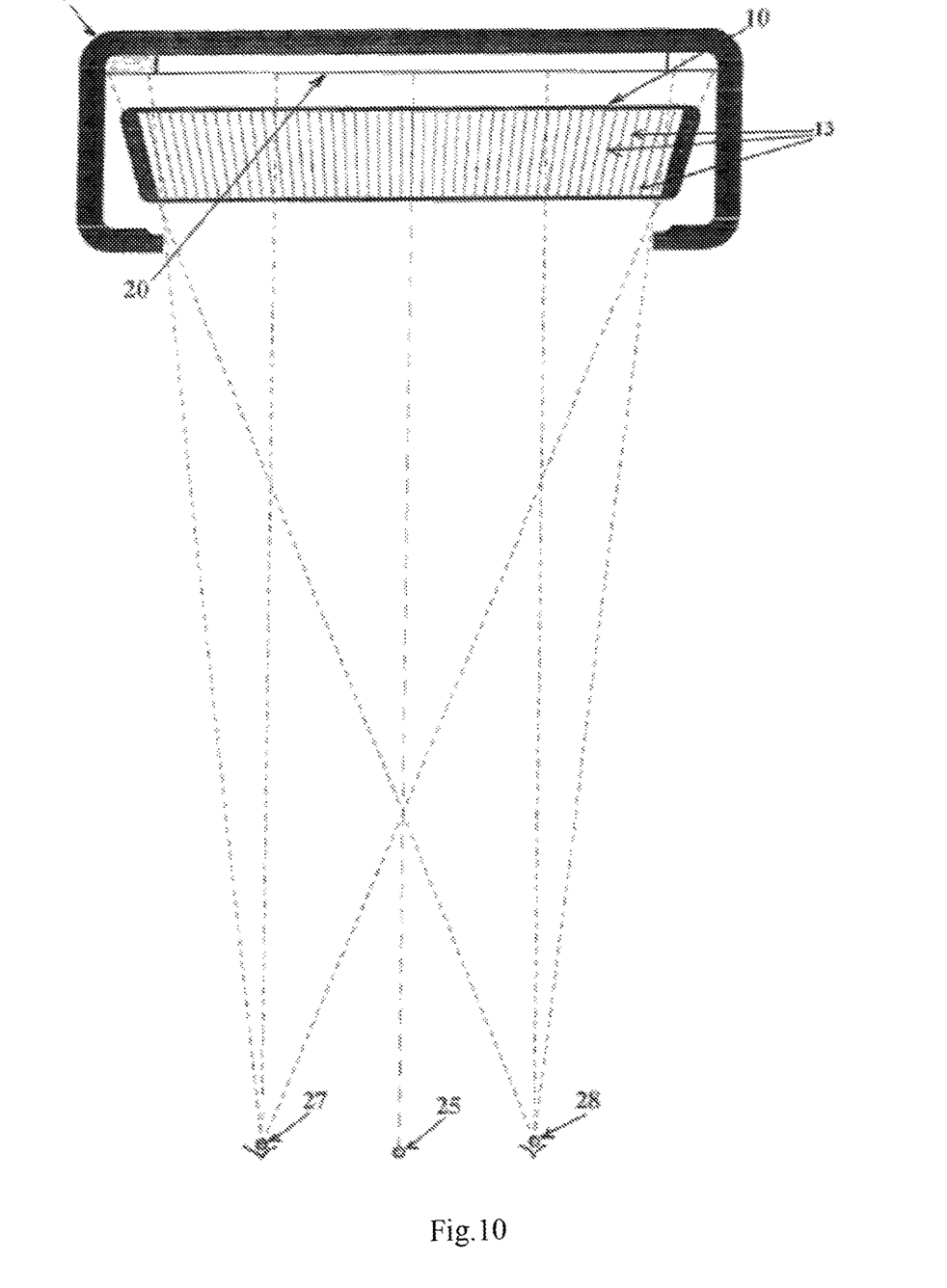
FIG. 10 illustrates the operation of the device according to this invention in the "special" position it assumes at the moment of image alternation.

FIG. 10 shows the device in central position, at the time of image alternation, seen from the focal point of the angle of sight 25 between the user's eyes. At the moment of image alternation, the right and left surfaces of the blocking strips 13 of the vibrating grid 10 block both eyes from seeing past it, while a line extended from the focal point of the angle of sight 25 passes directly through the gaps 14 between the blocking strips 13. In this view, the left eye sees the uniformly dark left lateral surface of the blocking strips 13, while the right eye sees the uniformly dark right lateral surface of the blocking strips 13. Thus, both eyes are simultaneously prevented from seeing through the device.

A detailed description of the operation of the invention is given on the basis of the above diagrams.

One possible construction of the containing frame 1 according to this invention is configured so that it incorporates the image display surface 20 and the vibrating grid 10 located in front of it, and joins both together with the purpose of reproducing a three-dimensional image in such a manner that when the left 27 and right 28 eyes see through the vibrating grid 10 while in operation, the continuous alternation of the left and right images on the image display surface 20 enables real-life 3D perception in the cerebellum 29 through the left 27 and right 28 eyes. The connecting ports 2 for the containing frame 1 securing the upper 12a and lower 12b connecting elements, preferably pivots, of the vibrating grid 10 ensure the possibility for stable rotation of the vibrating grid 10 in the horizontal plane towards the left and right, the operation of which is enabled by the control unit 8. The range of movement of the vibrating grid 10 is defined by the arc of vibration 3, and ensured by the end-positions of the adjustable magnetic stop-pins 4. Vibration of the vibrating grid 10 and its blocking strips 13 may be achieved either mechanically, or by means of electrical power.

In one embodiment, the image display surface 20 is located in the image projection housing 5, parallel to the back wall of the containing frame 1, while the transparent front panel 6 is imbedded in the front wall. The operation and regulation of the vibrating grid 10 operated within the containing frame 1 and the display of images on the image display surface 20 is accomplished by the control unit 8 by means of a control cable 9. By manually setting the image resolution, the user is "inputting his/her own interocular distance into the device," which then synchronously sets the left image centreline 22, the right image centreline 23, and the arc of vibration 18. The images displayed on the image display surface 20 belonging to the left 22 and right 23 image centrelines are always displayed at a distance corresponding to the interocular distance of the user 24, so as to be "displaced" to the right and left from the spatial centreline 21 of the image display surface.

The left and right images taken by a 3D "stereo" camera appear to alternate at a rate of at least (12+12), i.e. 24 times per second on the image display surface 20 so that at the moment of their appearance, the vibrating grid 10 located in front of the images ensures that it is possible to see past the grid in one of its end positions for the corresponding left 27 or right 28 eye. When recording, the 3D cameras can be placed at an arbitrary distance from one another. In their application in the field of space research, for example, that distance might be several thousand kilometers, while for the case of microscopic imaging, the distance might be less than a millimeter.

The vibrating grid 10 is a specially constructed vertical unit, moveable to the right and left in the horizontal plane about lower 12a and upper 12b connecting elements, in the frame 11 portion of which blocking strips 13 that enable three different viewing positions are arranged vertically and attached in immovable fashion so as to enclose an angle between them, such that their front edges are disposed radially so as to focus on a vertical edge of a focal point along a focal arc 26. The vibrating motion of the blocking strips 13 may be accomplished either mechanically, or by means of electrical power. Of the three different viewing positions, two enable the left eye 27 and the right eye 28, respectively, to see through the device, while the third option, occurring at the moment of image alternation, prevents both eyes simultaneously from seeing past the blocking strips 13. In this case, the focal point of the angle of sight along the focal arc is located precisely between the two eyes.

Turning the vibrating grid 10 horizontally about the lower 12a and upper 12b connecting elements enables the 3D perception of previously recorded images displayed at an alternation rate of at least 24 images/sec. and a relative displacement equal to the interocular distance of the user on the image display surface 20 located behind the vibrating grid 10 at the left and right end points of the distance of vibration 3 by the left 27 and right 28 eyes, alternately, while at the central position of the vibrating grid 10, i.e. at the moment of image alternation, the left 27 and right 28 eyes simultaneously see the uniformly dark left and right lateral surfaces formed by the blocking strips 13, such that neither eye can see past them.

With the display generated in accordance to this invention, the cerebellum 29 is of the erroneous "knowledge" that the two eyes before it simultaneously perceive, or see the image it implicitly interprets to be in 3D. The vibrating grid can be manufactured using any of several different technical methods, e.g. mechanically or electrically. Several of the specially constructed vibrating grids 10 could even be placed or constructed in series.

As follows from the above, the invention has attained its set objects and offers the following advantages:
- a realistic 3D experience achieved without recourse to special glasses,
- no adverse health effects, since the distance between the images seen by the left and right eyes corresponds exactly to the interocular distance of the user, as with natural sight,
- the device is simple and inexpensive to manufacture,
- the vibration of the grid and hence of the blocking strips may be accomplished either mechanically, or using electrical power,
- the invention lends itself to a variety of applications: large, medium-sized, and small monitors, smart telephones, and uses in the fields of education and entertainment, or even therapeutic applications or space research.

The invention claimed is:

1. A vibrating-grid space visualisation device enabling 3D perception for a single user, comprising a containing frame (1), an image display surface (20), and at least one vibrating grid (10) vibrated either mechanically, or by electric power, and the image display surface (20) is constructed behind the vibrating grid (10) on the interior surface of the containing frame (1), wherein the vibrating grid (10) is a vertically positioned unit, in the frame (11) of which vertically arranged blocking strips (13), all having a set width and edge, and configured radially to one another along their width, are attached in immoveable fashion, the theoretical elongations of their front edges (30) towards the user's eye focusing and converging on a vertical line at one point on the focal arc (26) between the user's right eye (28) and left eye (27); and the vibrating grid (10) is connected to the containing frame (1) by means of lower and upper connecting elements (12a, 12b) in a manner that accomplishes vibration of the vibrating grid (10) inside the containing frame (1) to the left and right in the horizontal plane along an arc of vibration (18); and on the image display surface (20) previously and from different points simultaneously recorded images are displayed at an alternation rate of at least 24 images/sec.

2. The vibrating-grid space-visualisation device according to claim 1, wherein more than one vibrating grid (10) may be constructed in series, with a first vibrating grid adjacent to a second vibrating grid.

3. The vibrating-grid, space-visualisation device according to claim 1, wherein the connecting elements (12a, 12b) are pivots.

4. The vibrating-grid, space-visualisation device according to claim 1, wherein on the arc of vibration (18) magnetic stop-pins (4) are equipped defining the two end points of the vibrating distance (3).

* * * * *